United States Patent [19]

Igarashi

[11] Patent Number: 5,742,299

[45] Date of Patent: Apr. 21, 1998

[54] PRINTING APPARATUS USING A CONTROL PROGRAM AND FONT DATA FROM DIFFERENT EXTERNAL MEMORY CARTRIDGES

[75] Inventor: Masaru Igarashi, Yokohama, Japan

[73] Assignee: Canon Kabushiki Kaisha, Tokyo, Japan

[21] Appl. No.: 844,369

[22] Filed: Apr. 18, 1997

Related U.S. Application Data

[63] Continuation of Ser. No. 302,990, Sep. 14, 1994, abandoned, which is a continuation of Ser. No. 989,887, Oct. 12, 1992, abandoned, which is a continuation of Ser. No. 309,877, Feb. 14, 1989, abandoned.

[30] Foreign Application Priority Data

Feb. 17, 1988 [JP] Japan .................................. 63-32653

[51] Int. Cl.$^6$ ........................................................ G06F 3/12
[52] U.S. Cl. ................................................................. 345/501
[58] Field of Search .......................... 364/DIG. 1, DIG. 2;
395/101, 110, 115, 116, 118, 501, 507,
508, 511, 512, 520, 521; 345/501

[56] References Cited

U.S. PATENT DOCUMENTS

| | | | |
|---|---|---|---|
| 4,181,965 | 1/1980 | Olander, Jr. et al. | 364/711 |
| 4,377,852 | 3/1983 | Thompson | 395/250 |
| 4,742,483 | 5/1988 | Morrell | 364/900 |
| 4,837,709 | 6/1989 | Sasaki | 364/519 |
| 4,837,712 | 6/1989 | Shibamiya | 364/523 |
| 4,872,091 | 10/1989 | Mamiwa et al. | 361/424 |

FOREIGN PATENT DOCUMENTS

| | | | |
|---|---|---|---|
| 1403704 | 8/1975 | United Kingdom | G06F 13/00 |
| 2161005 | 1/1986 | United Kingdom | G06K 15/02 |
| 2187313 | 9/1987 | United Kingdom | G06F 12/02 |
| 2192476 | 1/1988 | United Kingdom . | |

OTHER PUBLICATIONS

Peter Norton, "Inside the IBM PC.", Text Book by Brandy Books, a division of Simon & Schuster, Inc. ISBN 0-13-467325-5 published 1986 pp. 13-21, 65, 66, 121-130, 144-147, 247, 252, 277-281.

*Primary Examiner*—Robert B. Harrell
*Attorney, Agent, or Firm*—Fitzpatrick, Cella, Harper & Scinto

[57] ABSTRACT

There is provided an information processing apparatus having a detachable first ROM cartridge in which a control program and other information are stored; an instructing device to instruct whether the control program stored in the ROM cartridge is to be executed or not when the ROM cartridge is attached; a control circuit to control operation in response to an instruction of the instructing device; a second ROM cartridge which is provided in the apparatus and in which a control program is stored; and a detector to detect whether the first ROM cartridge is attached or not. When the instructing device instructs not to execute the control program stored in the first ROM cartridge, the control circuit allows the control program stored in the second ROM cartridge to be executed. With this apparatus, when the detachable ROM cartridge is attached, the information other than the control program can be read out of this ROM cartridge and can be used for various processes.

16 Claims, 6 Drawing Sheets

PRINTING APPARATUS USING A CONTROL PROGRAM AND FONT DATA FROM DIFFERENT EXTERNAL MEMORY CARTRIDGES

This application is a continuation of application No. 08/302,990 filed on Sep. 14, 1994, which is a continuation of application No. 07/989,887 filed on Dec. 10, 1992 which is a continuation of application No. 07/309,877 filed on Feb. 14, 1989, all of which are now abandoned.

BACKGROUND OF THE INVENTION

1. Field of the Invention

The present invention relates to an information processing apparatus to which a detachable cartridge for storing pattern information such as characters or the like, control program information, and the like is attached and which can read out and execute the control program, pattern information, or the like.

2. Related Background Art

Hitherto, there has been known a printer or the like in which, by attaching a detachable cartridge in which character fonts are stored to the printer main body, in addition to the character fonts which are inherently provided in the printer main body, fonts of a cartridge can be also used and the number of kinds of characters which can be printed can be increased. On the other hand, in general data processing apparatuses or the like, there has been known an apparatus in which a control program is assembled in a detachable cartridge, the cartridge is attached to the apparatus main body in accordance with the use object of the processing apparatus, and the control program is executed, thereby enabling a plurality of different control operations to be executed by the same processing apparatus.

However, for instance, in a printer or the like, the character fonts or the like provided in a certain program cartridge to control the printer can be used when the cartridge is attached to the printer and the control program of the cartridge is executed. But, they cannot be used when another cartridge is attached and its control program is executed.

SUMMARY OF THE INVENTION

It is an object of the present invention to provide an information processing apparatus in which a control program is stored in a detachable cartridge and a selection can be made with respect to whether the control program is to be executed or not.

Another object of the invention is to provide an information processing apparatus in which information other than a control program is read out of a detachable cartridge in which both control program and various other kinds of information such as pattern information and the like are together stored and the readout information can be used for various processes.

Still another object of the invention is to provide an information processing apparatus in which both a control program and various other kinds of information such as pattern information and the like are together stored in each of a plurality of detachable cartridges, a desired cartridge is selected, and either the execution of the control program or the use of various kinds of information is selectively executed, thereby enabling the information in the plurality of detachable cartridges to be effectively used.

Still another object of the invention is to provide an information processing apparatus in which the number of times a detachable cartridge has to be attached or removed is reduced, and the quality deterioration such as abrasion or the like in the apparatus main body and the connecting portion of the cartridge is decreased.

These and other objects, features and advantages of the present invention will be more fully understood from a consideration of the following detailed description of the preferred embodiments taken from conjunction with the accompanying drawings, in which like reference characters indicate like elements throughout.

DETAILED DESCRIPTION OF THE PREFERRED EMBODIMENTS

A preferred embodiment of the present invention will be described in detail hereinbelow with reference to the drawings.

Figure 1:
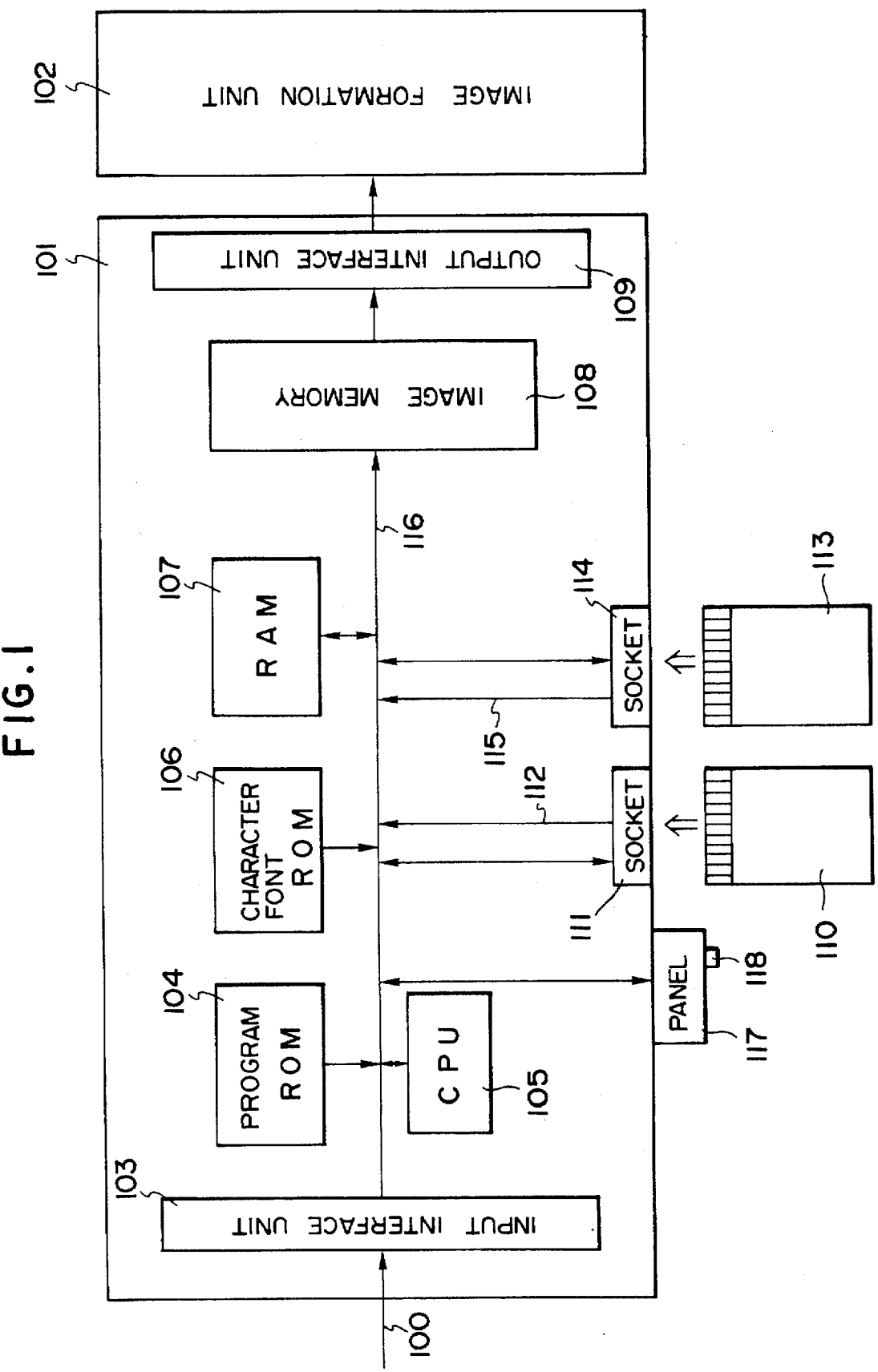
FIG. 1 is a block diagram showing a schematic construction of a printer in one preferred embodiment.

FIG. 1 is a block diagram showing a schematic construction of a printer of this embodiment.

In the diagram, reference numeral 101 denotes a control unit of the printer of the embodiment; 102 indicates an image formation unit of the printer to perform the printing, image formation, and the like; and 100 represents input data such as character codes, control information, or the like which is input from an external apparatus such as a host computer or the like. An input interface unit 103 receives the input data 100 and outputs onto a system bus 116. Reference numeral 105 denotes a CPU such as a microprocessor or the like to control the whole apparatus. The CPU 105 outputs various kinds of control signals or the like in accordance with a control program stored in a program ROM 104 and executes a control which will be explained hereinlater.

Reference numeral 106 denotes a character font ROM in which character font information is stored; 107 indicates an RAM which is used as a work area of the CPU 105 and performs the temporary storage of various data and the like; 108 an image memory to store print information (dot pattern) of at least one page; and 109 an output interface unit for reading out image data from the image memory 108 and for outputting to the image formation unit 102.

Reference numerals 110 and 113 denote ROM cartridges in each of which either one or both of a control program and various kinds of data are stored. In the following description, it is assumed that both the control program and the character fonts are stored in each of the ROM cartridges 110 and 113. The ROM cartridges 110 and 113 are detachably attached to the main body of the control unit 101 by sockets 111, and 114, respectively, the contents of the cartridges 110 and 113 are read out by the CPU 105 and are output onto the system bus 116 and are used for various controls. Reference numerals 112 and 115 denote detection signals to detect that the cartridges 110 and 113 have been attached to the sockets 111 and 114, respectively. Reference numeral 117 denotes a panel unit including an operation panel, a display, and the like. Various kinds of instructions can be input to the CPU 105 by means of operating switches arranged on the panel 117. In particular, a switch 118 is used to select a control program. When a cartridge is attached, if the switch 118 is OFF, the execution of the control program of the cartridge is instructed. If the switch 118 is ON, the execution of the internal control program is instructed.

In the foregoing construction, the operation when none of the cartridges 110 and 113 is attached will be first described. When various kinds of data such as character codes and the like are input through the input interface unit 103, they are analyzed by the CPU 105. The character codes are developed into character patterns by the character font ROM 106 and stored at a proper position in the image memory 108. When the dot pattern data of one page is stored in the image memory in this manner, the pattern data is output to the image formation unit 102 through the output interface unit 109 and printed.

The operation when one or both of the cartridges are attached will now be described.

When it is detected by the detection signals 112 and 115 that one or both of the cartridges 110 and 113 are attached, the CPU 105 selects either the control program of the cartridge or the control program in the internal program ROM 104 in accordance with the setting and executes it for the cartridge attached in the case where either one of the cartridges is attached or for the cartridge having a higher priority in the case where both of the cartridges are attached. If necessary, the CPU 105 reads out the font information of the cartridge in accordance with an instruction and develops the input code information to the pattern and stores the pattern into the image memory 108.

The above operations will now be described in detail hereinbelow with reference to FIGS. 2 and 3.

Figure 2:
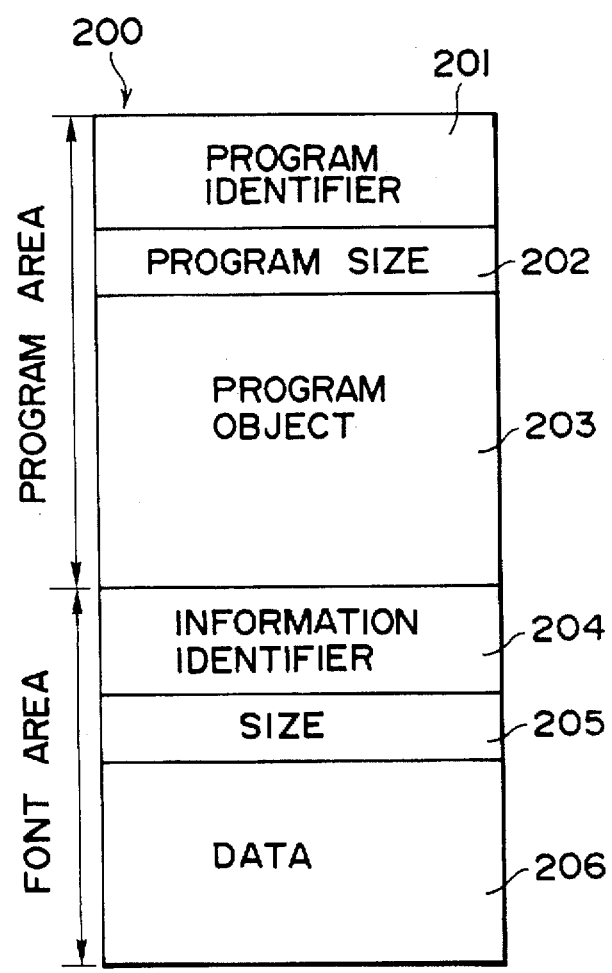
FIG. 2 is a diagram showing a data structure in a cartridge.

FIG. 2 is a diagram showing a data structure in the ROM cartridge. The data structure is common for both of the cartridges 110 and 113.

Both a control program and character fonts are provided in a ROM cartridge 200. A program identifier 201 is provided in the head of a control program area and indicates that the control program is included in the subsequent area. Reference numeral 202 denotes size information indicative of a capacity of object codes of all of the programs including the identifier 201, and 203 denotes an object portion in which an instruction code of the actual program is stored.

An indentifier indicative of the kind of data after the program object 203 is stored in an information identifier 204. In this case, the identifier indicative of the font information is stored. Reference numeral 205 represents size information indicative of a capacity of a font object 206 and 206 denotes actual font data.

When both the font data and the control program mixedly exist in one cartridge, the control program data is stored first.

Figure 3:
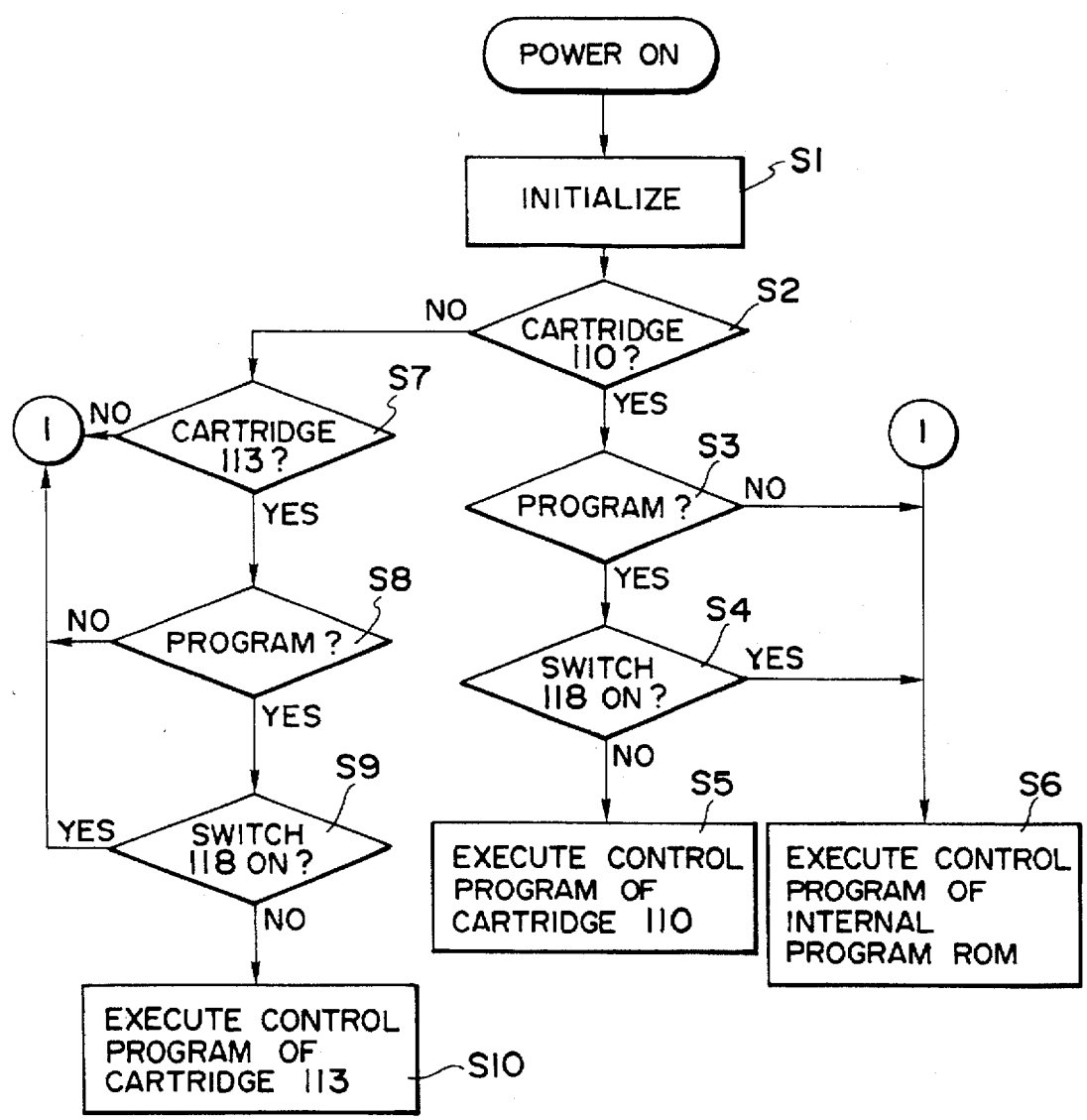
FIG. 3 is a flowchart showing the operation when a power supply is turned on in the printer of the embodiment.

FIG. 3 is a flowchart showing the operation in the printer of this embodiment. An operation program is stored in the program ROM 104 and is started by turning on the power supply of the printer.

When the power supply is turned on, the processing routine advances to step S1 and the whole apparatus is initialized. In step S2, a check is made by the detection signal 112 to see if the cartridge 110 has been attached to the socket 111 or not. If YES, a check is made in step S3 to see if the control program has been stored or not by discriminating the identifier of the data in the cartridge 110.

If no control program is stored in step S3, the control program in the internal program ROM 104 is executed in step S6. If the control program has been provided in the cartridge 110, a check is made in step S4 to see if the switch 118 to select the control program on the panel 117 has been depressed or not. If YES, that is, if the execution of the internal control program is instructed, step S6 follows. If the switch 118 is not depressed, the control program provided in the cartridge ROM 110 is executed in step S5.

On the other hand, if the cartridge ROM 110 is not attached in step S2, a check is made in step S7 to see if the cartridge ROM 113 has been attached to the socket 114 or not. If YES, a check is made in step, S8 to see if the control program has been stored in the cartridge 113 or not. If YES in step S8, a check is made in step S9 to see if the switch 118 has been depressed or not. If the switch 118 is not depressed, the control program in the cartridge 113 is executed in step S10.

In this manner, according to this embodiment, when the power supply is turned on, check is first preferentially made to see if the cartridge 110 has been attached to the socket 111 or not. If NO, a check is then made to see if the cartridge 113 has been attached or not. When the control program is stored in the cartridge and, at the same time, the switch 118 is OFF, by executing the control program, the program to be executed can be selected with the ROM cartridge attached.

Figure 4:
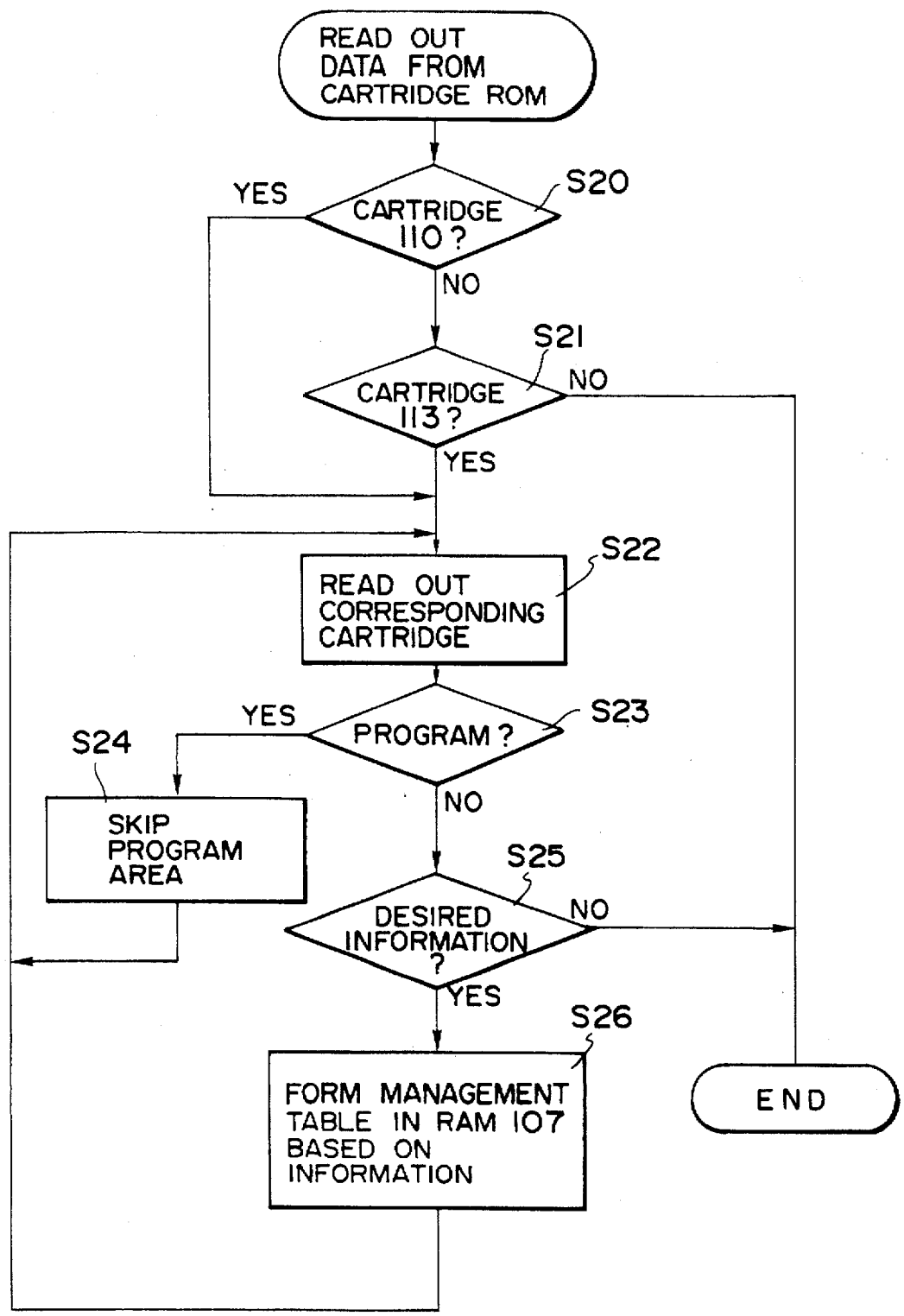
FIG. 4 is a flowchart showing the process to read out data from a cartridge ROM.

FIG. 4 is a flowchart showing the process to read out data from the cartridge ROM according to the internal program provided in the program ROM 104.

First, in step S20, a check is made by the detection signal 112 to see if the cartridge 110 has been set or not. If YES, step S22 follows. If NO, a check is made in step S21 by the detection signal 115 to see if the cartridge 113 has been attached or not. If none of the cartridges 110 and 113 is attached, the processing routine is finished. If either one or both of the cartridges have been attached, step S22 follows. If the cartridge 110 has been set, the process to read out data from the cartridge 110 is started. If only the cartridge 113 has been attached, the process to read out data from the cartridge 113 is started.

A check is made in step S23 to see if the control program is stored in the cartridge or not. If YES, the program area is skipped on the basis of the size information 202. Thereafter, the processing routine is returned to step S22 and the next data is read out from the cartridge. After the information other than the control program has been read out, a check is made in step S25 to see if the readout information is the desired information or not.

If NO in step S25, no process is executed here and the processing routine is finished. If it is confirmed by the identifier 204 that the desired information is included, step S26 follows and a management table is made in the RAM 107 in correspondence to the desired information. In this case, the desired information is, for instance, character fonts, form data, macro data, or the like.

Figure 5:
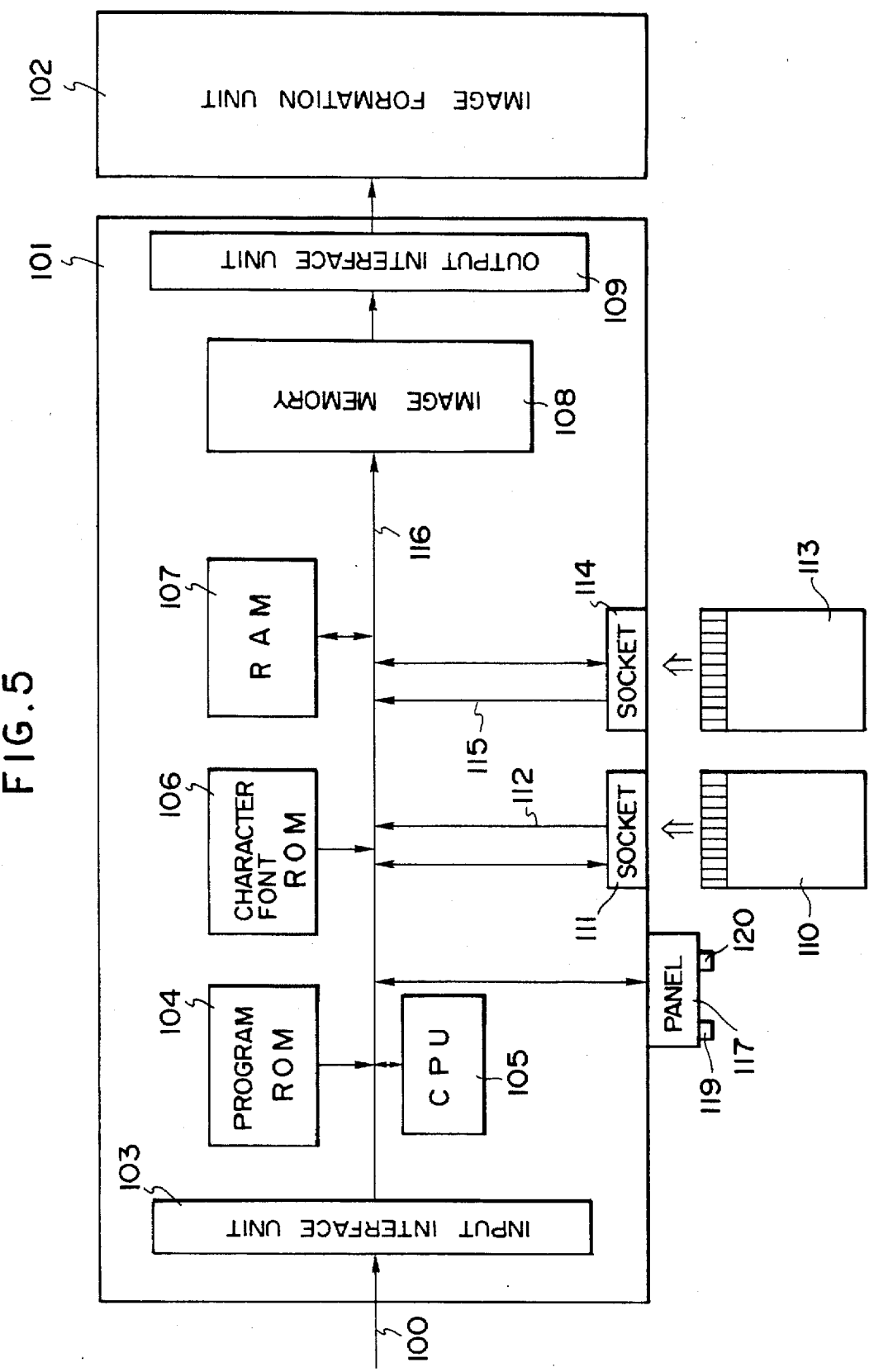
FIG. 5 is a block diagram showing a schematic construction of a printer in another embodiment.

FIG. 5 is a block diagram of a printer in another embodiment. In the embodiment, either one of the sockets 111 and 114 is selected by switching the switch on the panel 117 without providing the priorities for the cartridges 110 and 113.

Figure 6:
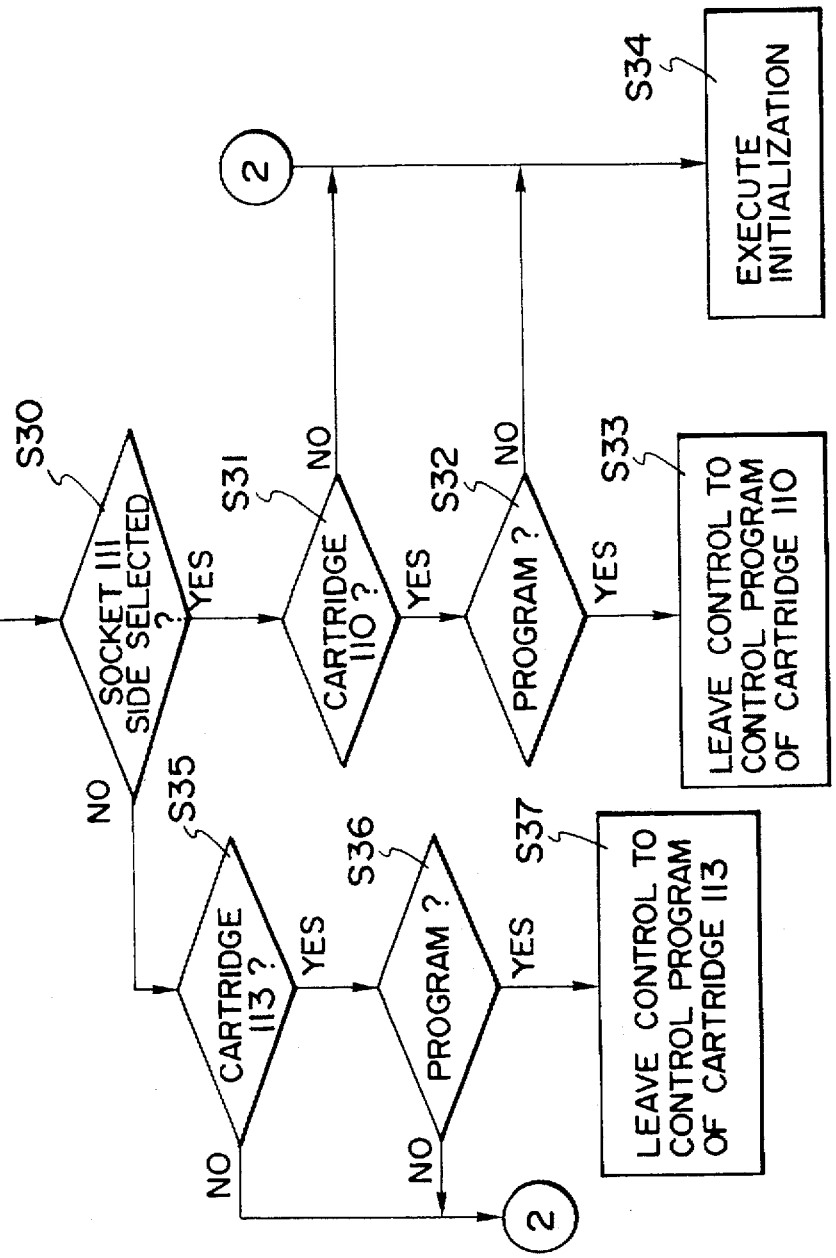
FIG. 6 is a flowchart showing the switch inputting process in another embodiment.

The case where the reset switch 120 is used will be described. When the switch 120 is depressed, the processing routine (see FIG. 6) advances to step S30 and a check is made to see if the side of the socket 111 has been selected by a switch 119 of the panel 117 or not. If YES, step S31 follows and a check is made to see if the cartridge 110 has been attached or not.

If the cartridge 110 is not attached, initialization is executed in step S34. If the cartridge 110 has been attached, a check is made in step S32 to see if the control program is provided in the cartridge 110 or not. If YES, the control program in the cartridge 110 is executed in step S33.

On the other hand, if the side of the socket 114 has been selected in step S30, a check is made in step S35 to see if the cartridge 113 has been attached or not. If the cartridge 113 has been attached and, at the same time, if the control program is stored in the cartridge 113, the control program in the cartridge 113 is executed in step S37. In this case, if the cartridge 113 is not attached or the control program is not internally stored, initialization is executed in step S34.

In this manner, the execution of the control program can be also switched by using the switch of the panel 117.

Although these embodiments have been described with respect to the case of the printer, the invention can be also applied to any data processing apparatus to which a plurality of ROM cartridges can be attached.

Although two cartridges have been provided in the embodiments, even in the case where three or more cartridges are used, the invention can be almost similarly realized by easily changing the construction of the switch or the like.

In these embodiments, one of a plurality of cartridges is selected and a selection is made with respect to whether the contents stored in the selected cartridge are to be used or the contents stored in an internal memory unit are to be used. However, it is also possible to construct the device in a manner such that a control program of a certain cartridge is executed and information other than the control program is read out from another cartridge and can be used.

On the other hand, information regarding which one of a plurality of cartridges is to be used and also regarding the kind of content stored in the cartridge to be used can be designated by a dip switch or the like, or such information can also be stored in a non-volatile RAM or the like.

Further, although a discrimination regarding whether the cartridge has been set or not has been made on the basis of the detection signal from the socket, the presence or absence of the cartridge can be also discriminated on the basis of the identifier or the like of the cartridge.

Although not explained in the foregoing, the control program in the cartridge ROM can be also used to control the data in the ROM.

As described above, according to this embodiment, in the data processing apparatus to which a plurality of cartridges can be attached or the like, there are advantages such that both the control program and the data such as character fonts or the like are stored in advance in each of the cartridges, the control program is read out of an arbitrary cartridge and executed, and the information in the cartridge can be used for another control program or the like.

Even when the cartridge ROM is attached, a process other than the internal control program provided in the cartridge ROM can be executed, so that there are advantages such that the number of times the cartridges need to be attached or detached is reduced and the abrasion of the connector portion of the socket or cartridge can be prevented.

As described above, according to the invention, there is an advantage such that either the control program of the cartridge attached or the control program provided in the apparatus main body can be selected and executed.

In addition, there are advantages such that the control program of the cartridge can be executed and various kinds of data of the cartridge can be used for various control programs.

What is claimed is:

1. A printing apparatus comprising:

first connecting means for detachably connecting first memory means storing a first print control program and first font data;

second memory means for storing a second, different print control program therein;

selecting means for selecting execution of the first print control program or execution of the second print control program;

developing means for developing a first dot pattern corresponding to entered code information using the first font data stored in the first memory means when the execution of the second print control program is selected by said selecting means and the second print control program is executed;

generating means for generating a control table corresponding to the first font data;

printing means for effecting printing based on the first dot pattern;

a host computer for supplying character code to be printed to said printing apparatus;

second connecting means for detachably connecting third memory means storing a third print control program, different from the first and second print control programs, and second font data therein; and developing means for developing a second dot pattern corresponding to entered code information using the first font data stored in the first memory means when execution of the third print control program is selected by said selecting means and the third print control program is executed.

2. A printing apparatus comprising:

first connecting means for detachably connecting first memory means storing a first print control program and first font data;

second memory means for storing a second, different print control program therein;

selecting means for selecting execution of the first print control program or execution of the second print control program; and developing means for developing a first dot pattern corresponding to entered code information using the first font data stored in the first memory means when the execution of the second print control program is selected by said selecting means and the second print control program is executed.

3. The apparatus according to claim 2, further comprising generating means for generating a control table corresponding to the first font data.

4. The apparatus according to claim 2, further comprising printing means for executing printing based on the developed dot pattern.

5. The apparatus according to claim 2, further comprising a host computer for supplying character code to be printed to said printing apparatus.

6. The apparatus according to claim 2, further comprising:

second connecting means detachably connecting third memory means storing a third print control program, different from the first and second print control programs, and second font data therein; and developing means for developing a second dot pattern corresponding to entered code information using the first font data stored in the first memory means when execution of the third print control program is selected by said selecting means and the third print control program is executed.

7. A method for effecting printing in a printing apparatus comprising connecting means for detachably connecting first memory means storing a first print control program and first font data, and second memory means for storing a second, different print control program therein, said method comprising the steps of:

selecting execution of the first print control program or execution of the second print control program; and developing a first dot pattern corresponding to entered code information using the first font data stored in the first memory means when the execution of the second print control program is selected in the selecting step and the second print control program is executed.

8. A method according to claim 7, further comprising the step of generating a control table corresponding to the first font data.

9. A method according to claim 7, further comprising the step of causing printing means to effect printing based on the first dot pattern developed in the developing step.

10. A method according to claim 7, further comprising the step of inputting character code to be printed from a host computer to the printing apparatus.

11. A method according to claim 7, wherein the printing apparatus further comprises second connecting means for detachably connecting third memory means storing a third print control program and second font data, and wherein said method further comprises the step of developing a second dot pattern corresponding to entered code information using the first font data stored in the first memory means when the execution of the third print control program is selected in the selecting step and the third print control program is executed.

12. A memory medium for storing program code read out by CPU of a printing apparatus comprising connecting means for detachably connecting first memory means storing a first print control program and first font data, and second memory means for storing second print control program, said memory medium storing program code comprising:

selecting code for selecting execution of the first print control program or execution of the second print control program; and developing code for developing a first dot pattern corresponding to entered code information using the first font data stored in the first memory means when the second print control program to be executed is selected in the selecting step and the second print control program is executed.

13. A memory medium according to claim 12, further comprising code for generating a control table corresponding to the first font data.

14. A memory medium according to claim 12, further comprising code for causing printing means to effect printing based on the developed dot pattern.

15. A memory medium according to claim 12, further comprising code for inputting character code to be printed from a host computer to said printing apparatus.

16. A memory medium according to claim 12, wherein the printing apparatus further comprises second connecting means for detachably connecting third memory means storing a third print control program and second font data, and wherein said memory medium comprises code for developing a second dot pattern corresponding to entered code information using the first font data stored in the first memory means when execution of the third print control program is selected by the selecting code and the third print control program is executed.

* * * * *

UNITED STATES PATENT AND TRADEMARK OFFICE
CERTIFICATE OF CORRECTION

PATENT NO.   : 5,742,299
DATED        : April 21, 1998
INVENTOR(S)  : Masaru Igarashi It is certified that error appears in the above-identified patent and that said Letters Patent is hereby corrected as shown below:

<u>Title page,</u>
Item [63], Related U.S. Application Data, "Oct. 12, 1992" should read -- Dec. 10, 1992, --.

Item [73] Assignee, "Canon Kabushiki Kaisa" should read -- Canon Kabushiki Kaisha --.

Item [56] References Cited, U.S. PATENT DOCUMENTS, "Mamiwa et al." should read -- Maniwa et al. --.

<u>Column 1,</u>
Line 61, "detachable," should read -- detachable --.

<u>Column 2,</u>
Line 8, "from" should read -- in --.

Signed and Sealed this

Fifth Day of February, 2002

*Attest:*

*Attesting Officer*

JAMES E. ROGAN
*Director of the United States Patent and Trademark Office*